US006934041B2

(12) United States Patent
Liston et al.

(10) Patent No.: US 6,934,041 B2
(45) Date of Patent: Aug. 23, 2005

(54) METHOD AND APPARATUS FOR MINIMIZING THE INFLUENCE OF REGISTER DIFFERENCES

(75) Inventors: Christopher Liston, Rochster, NY (US); Patrick Metzler, Gettorf (DE); Karlheinz Walter Peter, Molfsee (DE); Ralph Petersen, Kiel (DE); Ingo Klaus Dreher, Kiel (DE)

(73) Assignee: Eastman Kodak Company, Rochester, NY (US)

( * ) Notice: Subject to any disclaimer, the term of this patent is extended or adjusted under 35 U.S.C. 154(b) by 839 days.

(21) Appl. No.: 09/858,378

(22) Filed: May 16, 2001

(65) Prior Publication Data

US 2001/0043351 A1 Nov. 22, 2001

Related U.S. Application Data

(60) Provisional application No. 60/204,854, filed on May 17, 2000.

(51) Int. Cl.[7] .............................................. G06F 15/00
(52) U.S. Cl. ...................................... 358/1.13; 358/1.9
(58) Field of Search ........................ 358/1.1, 1.8, 1.9, 358/1.13, 1.15, 448, 518, 1.2, 1.4; 382/162; 101/211, 216

(56) References Cited

U.S. PATENT DOCUMENTS 5,036,764 A * 8/1991 Rodi ............................ 101/211
5,181,257 A * 1/1993 Steiner et al. ............... 382/162
5,878,665 A * 3/1999 Muller ......................... 101/216

FOREIGN PATENT DOCUMENTS

GB          2063168 A  *  6/1981   ........... B41F/13/22

* cited by examiner

Primary Examiner—Gabriel Garcia
(74) Attorney, Agent, or Firm—Lawrence P. Kessler

(57) ABSTRACT

The invention relates to a method and apparatus for minimizing the influence of register differences in multicolor printing, in particular in digital printing processes, register values (1) in the transport direction (2), which are different transversely with respect to this direction being set to a value between the extremes (3, 3').

The invention is intended to carry out a development such that the influence of register differences on the image quality can be minimized reliably and to a great extent. This is achieved by a number of individual values of the register values (1) being measured and an average value (4, 4') being determined from these and brought into alignment with the average value (4, 4') from at least one further color printing unit (5, 5', 5", 5''').

19 Claims, 2 Drawing Sheets

METHOD AND APPARATUS FOR MINIMIZING THE INFLUENCE OF REGISTER DIFFERENCES

CROSS REFERENCE TO RELATED APPLICATION

Reference is made to and priority claimed from U.S. Provisional Application Ser. No. 60/204,854, filed May 17, 2000, entitled: METHOD AND APPARATUS FOR MINIMIZING THE INFLUENCE OF REGISTER DIFFERENCES.

The invention relates to a method of minimizing the influence of register differences in multicolor printing, in particular in digital printing processes, register values in the transport direction which are different transversely with respect to this direction being set to a value between the extremes. The invention also relates to apparatus for implementing a method of this type, having at least one sensor for measuring register.

In multicolor printing, colored illustrations are produced by color separations being printed one above another. As a rule, these are four primary colors. The register is the mutual positioning of these color separations. Register faults make the print quality worse and must be avoided. These faults cannot always be corrected fully, in particular when the register offset is curved, wavy or extends irregularly transverse to the transport direction. For example, in multicolor printing machines in which the color separations are produced as electrostatic latent images, or, in the case of ink-jet or similar writing heads, are likewise produced in a digital manner on an image cylinder, curvature occurs in the lines of image points applied. Since this curvature deviates from the straight line, it is a register fault of this type, which cannot be corrected fully.

DE 693 19 308 T2 discloses a method of the type mentioned at the beginning in which the influence of such errors is eliminated by the register marks being put together closer than the image width. In this way, it is possible to reduce the register differences between two printing units if the register deviations occur, for example, in the form of two curves curved in different directions. However, the problem with this technical solution is that, depending on the form of the register deviations, a reduction of this type in the register differences is not achieved, or even that impairment occurs.

The invention is therefore based on the object of configuring a method and an apparatus of the type mentioned at the beginning in such a way that the influence of register differences on the image quality can be minimized reliably and to a great extent.

With regard to the method, the object is achieved by a number of individual values of the register values being measured and an average value being determined from these and brought into alignment with the average value from at least one further color printing unit.

With regard to the apparatus, the object is achieved by at least one sensor being designed in such a way that it measures at least two measurement locations on the register that are spaced apart transversely with respect to the transport direction, and by a computer being provided which is designed in such a way that it calculates average register values and brings the average register values of at least two color printing units into alignment with one another.

By means of the invention, by means of immediate or previous measurement, many individual values of the register in the transport direction are measured, the measured values being distributed over the width of the printing substrate, transversely with respect to the transport direction. Here, the number of values must be chosen in such a way that it is sufficient for an adequately exact determination of an average. An average can be determined from these values by various methods and made the basis for controlling the register.

The advantage of the invention resides in the fact that the influence of register differences can be minimized irrespective of the form which these register differences have transversely with respect to the transport direction. The values of the register can therefore form a curved shape viewed over the width of the printing substrate or can run in a wave shape or completely irregularly. By means of the invention, irrespective of these forms, an optimum average can always be determined for each color separation, these values being brought into alignment for all the color printing units in order to achieve optimum register coincidence. At the same time, it is possible to determine the register values in various ways and to calculate the average values in various ways.

Thus, one development of the method provides for the register values to be measured at a number of locations transversely with respect to the transport direction. Another proposal is for the variation of a line of image points to be measured and the data stored, for the register values transversely with respect to the transport direction to be measured at least one location, and for the variation of the line of image points to be determined from the data and the at least one measurement, and for the average value to be calculated. The proposals can be used universally, both in electrostatic and in other digital printing processes. In many digital printing processes, for example electrostatic printing processes, the images are produced by writing heads on carriers, which are generally image cylinders, are then provided with toner and printed onto the substrate. Given such a production of lines of image points by writing heads, deviations from a straight line occur. Deviations of this kind are machine-specific data for the respective writing head, which occur approximately in the same way in each print. They can therefore be measured once and stored, so that the position of such a stored curve for the current case can be defined by means of one or two measured points. This method has the advantage that the exact determination of the average of the register can be performed in the setting phase by means of only one or two measurements. As a result, the outlay on measurement is reduced, but the average can nevertheless be formed from a large number of data.

The determination of the average is possible in various ways. There may be a pure calculation of the average register, or it is possible for the deviations determined to be weighted in order to calculate an average value. In the case of such weighting, there is also a very wide range of calculation methods; one proposal is quadratic weighting. The success of such weighting is that the average value is placed between the upper and lower values in such a way that as far as possible none of the deviations is visible in the image. By means of quadratic weighting, an average value can be approximated to a register value located further away in order to minimize the fault in this area in such a way that it becomes invisible in the image. In addition to using quadratic weighting, this could also be performed by the median between the lowest and the highest value being taken as the average value. Conversely, however, it is also possible for the lowest and highest values not to be included in the determination of the average value. The last method takes into account the fact that individual "outliers" are visible, but these cannot however influence the formation of an average value in such a way that a register fault becomes visible over the entire image area.

The possibilities of various averaging methods are not defined in the invention; other types are conceivable. The type of averaging can be selected, for example, depending on the image content and sheet format.

An advantageous refinement of the method provides for the average values of all the color printing units to be brought into alignment with the average value of a reference printing unit. In this case, the average value from the reference printing unit forms the scale for the alignment of the register of the other color prints.

The values of the register can also be determined in various ways. The measurement of entire lines of image points is possible, or provision can be made for the register values to be determined by measuring at least two register marks arranged spaced apart transversely with respect to the transport direction. In this case, the determination of an average naturally becomes all the more accurate the more measured values are available. The measurement of a line of register marks running transversely with respect to the transport direction is also expedient, even if the data relating to the variation of the line of image points from a writing head has already been stored and it is merely necessary to fit these data into the correct position.

The register marks can be printed on a carrier for printing substrates and subsequently removed again. This has the advantage that a precise setting can be performed before printing a substrate. However, the register marks can also be printed onto a substrate lying on the carrier for printing substrates. This may be a test substrate, or it is also possible to print such register marks on an image-free edge of a printing substrate and, on the basis of detecting these register marks, to provide a correction by means of a control system during printing. In the case of digital printing processes, a correction of this type can be made between the performance of each individual print.

In a manner corresponding to the method, the apparatus can be developed in such a way that the computer is designed in such a way that it brings the average values of all the color printing units into alignment with the average value from a reference printing unit.

In order to obtain the register values, provision can be made for the at least one sensor to be designed to measure a large number of measurement locations transversely with respect to the transport direction, or for a large number of sensors to be arranged transversely with respect to the transport direction.

One embodiment of the apparatus provides for at least one sensor to be arranged transversely with respect to the transport direction, to be able to detect all the color separation prints, and for the computer to be loaded with data relating to the variation of a line of image points of at least one writing head and to determine the average values from the measurements of the sensors and the data. Two sensors are required if the angle of the writing head transversely with respect to the transport direction or of elements between writing head and substrate is not known or has been subjected to changes. The data can be stored as machine-specific nominal values of at least one but preferably all writing heads. In this case, they can be supplied by the manufacturer of the writing heads or measured and recorded following installation. However, it is also possible for sensors to be arranged to determine the data. This data can then be updated continuously, which has the advantage that changes, for example as a result of temperature changes, are taken into account.

One refinement of the apparatus provides for register marks to be detected for the measurement. For this purpose, at least one sensor is provided to detect at least two register marks arranged spaced apart transversely with respect to the transport direction. The number of sensors in turn depends on whether data for the writing heads is already available, or whether the precise detection of all the measured values along a line located transversely with respect to the transport direction is necessary.

Both the arrangement of the sensors and the design of the computer can have various variations, it being possible for the configurations of the apparatus to be such that all of the aforementioned method steps and variations of the method can be implemented.

The invention will be explained below using the drawing, in which.

Figure 1:
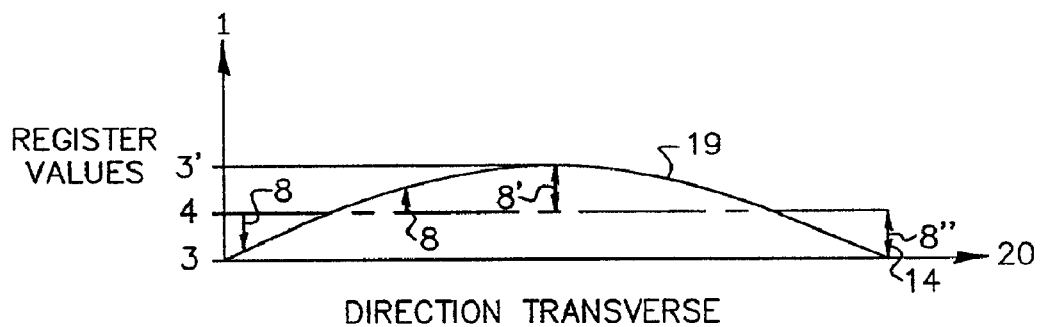
FIG. 1 shows a determination of an average value of a register.

FIG. 1 shows a basic illustration for determining an average value 4 of a register 1. In this case, various register values 1 are plotted against the direction 20 transverse to the transport direction 2, it being possible to see register deviations 8, 8', 8", 8''', 8'''', 8''''' which occur over the course of the paper width 14.

In the exemplary embodiment illustrated, the register deviations 8, 8', 8" are related to the average value 4 but they can also be related directly to the register 19' of a different color printing unit 5, 5', 5", 5'''. However, only the register 19 of one color printing unit 5, 5', 5", or 5''' is illustrated here. The average value 4 is located here in a central region between the lowest value 3 and the highest value 3'.

Figure 2:
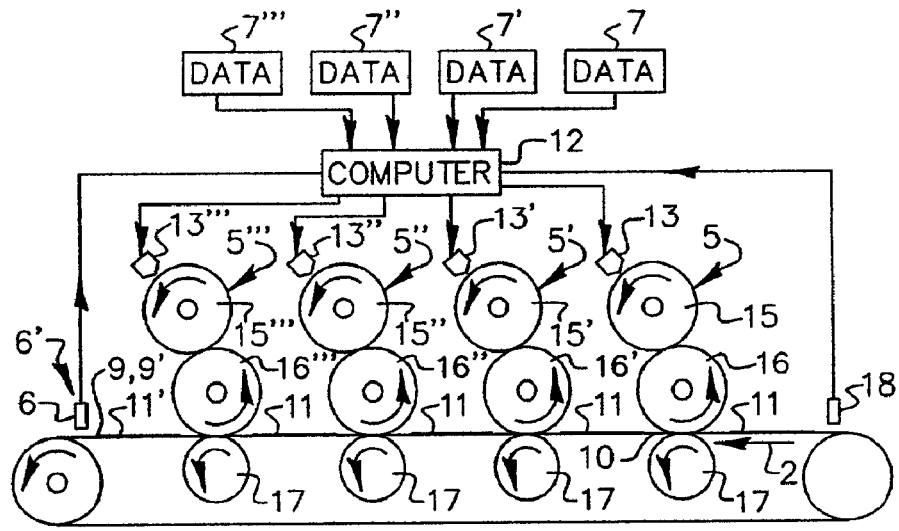
FIG. 2 shows a basic tllustration of a printing machine with an apparatus according to the invention.

FIG. 2 shows the basic configuration of a printing machine having an apparatus according to the invention. The printing machine illustrated has four color printing units 5, 5', 5", 5''', each of these color printing units 5, 5', 5", 5''' having a writing head 13, 13', 13", 13''', which in each case sets an electrostatic latent color separation on an image cylinder 15, 15', 15", 15'''. These color separations are transferred from the image cylinders 15, 15', 15", 15''' to image transfer cylinders 16, 16', 16", 16'''. From there, they pass onto the printing substrates 11, 11', impression cylinders 17 supporting the transfers by means of their electrical charge and mechanically. Here, the printing substrates 11, 11' are carried by a carrier 10, which is designed as a belt that is carried on rollers and driven by a roller.

Provision is made for a computer 12, which, on one hand, is connected to the writing heads 13, 13', 13", 13''' and, on the other hand, is connected to a sensor 18 for detecting substrates and tO measurement locations 6, 6'.

The latter can be designed as sensors 6, 6' arranged transversely with respect to the transport direction 2 in order to measure register marks 9, 9'. The sensor 18 for substrate detection gives a signal to the computer 12 when a printing substrate 11, 11' is fed to the machine. The computer 12 then controls the writing heads 13, 13', 13", 13''' in order to cause the latter to set an image on the image cylinders 15, 15', 15", 15''' in such a way that the color separations pass exactly in-register onto the printing substrates 11. The sensors 6, 6' measure register marks 9, 9' which are printed at the same time, it being possible for the latter either to be printed directly onto the carrier 10 for the purpose of presetting, or to be printed onto a substrate which serves as a test substrate 11' for this measurement. However, the register marks 6, 6' can also be printed into an image-free edge of the printing substrates 11. The first options are used for presetting, the latter option is used for regulating the register during printing. In this case, there are two possibilities: either the measurement locations 6, 6' must measure a large number of the values transversely with respect to the transport direction 2, or only two or a few values are measured and these are evaluated, together with data 7, 7', 7'', 7''' relating to the variation of lines of image points of the writing heads 13, 13' 13'', 13''', to the effect that the latter perform the in-register setting of an image on the image cylinders 15, 15', 15'', 15'''.

Figure 3A:
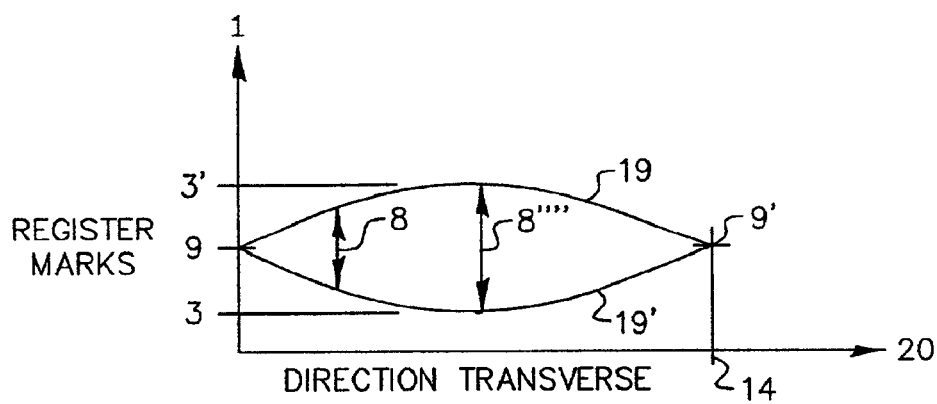
FIGS. 3a to 3d show a method according to the prior art.
Figure 3B:
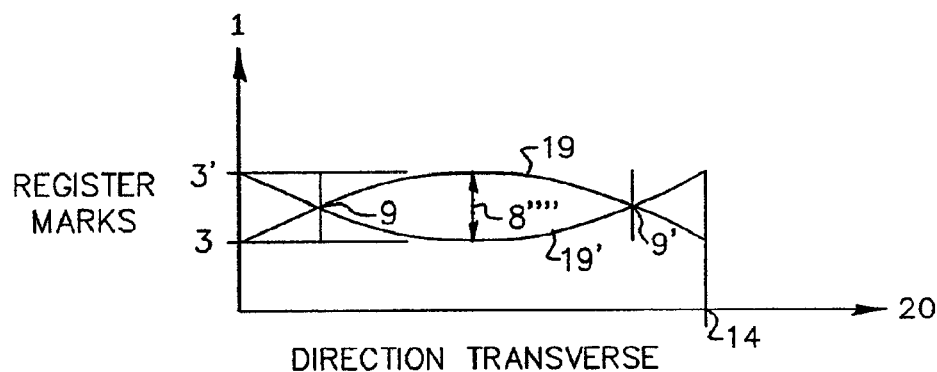
Figure 3C:
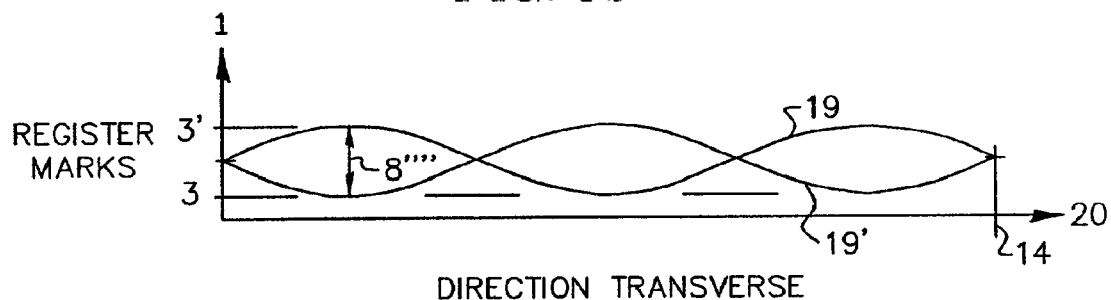
Figure 3D:
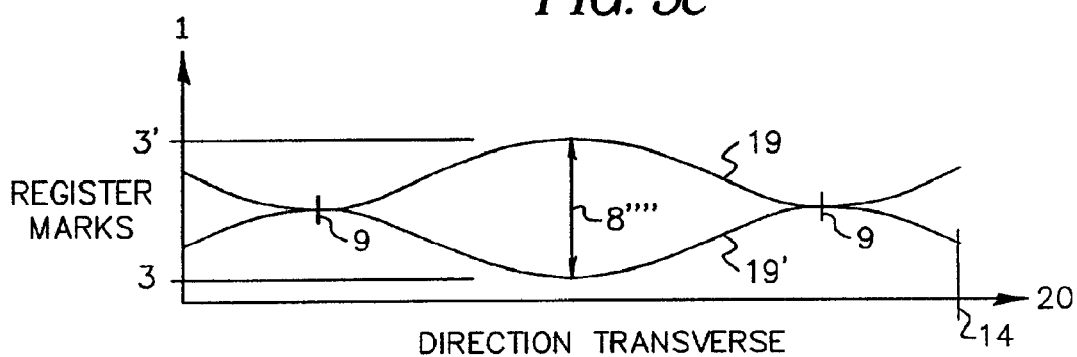

FIGS. 3a to 3d show a method according to the prior art, with which—as illustrated in FIGS. 3a and 3b—the intention is for two oppositely curved register deviations 19, 19' to be corrected. This primarily concerns reducing the maximum register deviation 8'''' of the registers 19, 19' of two color printing units 5, 5', 5'', 5'''. This is achieved by the register marks 9, 9', as illustrated in FIG. 3b, being moved closer together and, as a result, the maximum deviation 8'''' being reduced considerably. However, this method depends on the variation in the registers 19, 19' over the paper width 14. If the form of a wavy line occurs, as illustrated in FIG. 3c, then a measure of this type does not lead to any reduction in the maximum deviation 8'''', but leads to the fault even being made worse. This is illustrated in FIG. 3d, it being possible to see that pushing the register marks 9, 9' together considerably increases the maximum deviation 8'''' of the two registers 19 and 19'. As opposed to this, by means of the measure according to the invention, a reduction in the maximum deviation 8'''' of the registers 19, 19' is always achieved. The mutual relative position of the registers 19, 19' can also be optimized considerably by means of the invention, in order to achieve a high printing quality.

Figure 4:
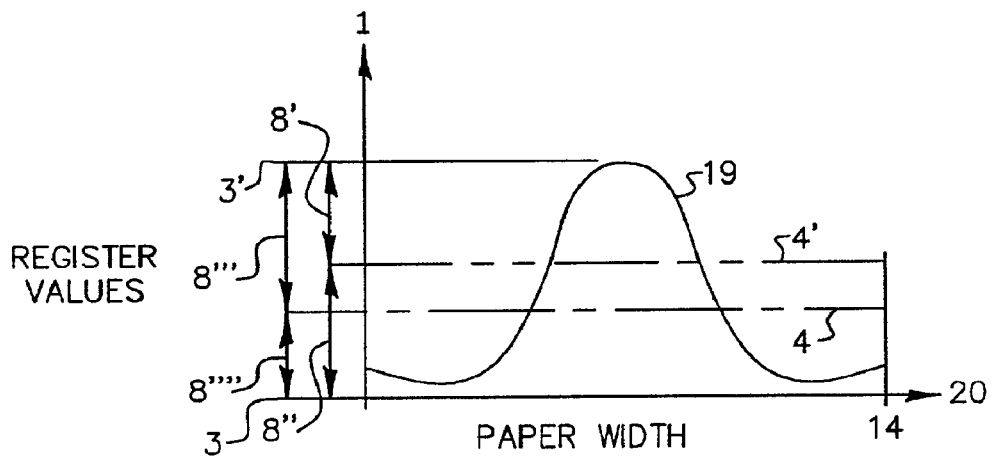
FIG. 4 shows various types of determinations of an average value of a register in accordance with the invention.

Such an optimization is shown by FIG. 4, various methods for determining an average value 4 or 4' of a register 19 or 19' being illustrated. Here, too, once again the register values 1 are plotted against the direction 20 transverse to the transport direction 2 in the area of the paper width 14. If an average value is calculated from the values of these registers 19, 19' by simple averaging, the average value 4 is reached. In the case of this average value 4, the maximum deviation 8''' from the highest value 3' is significantly lower than the maximum deviation 8'''' from the lowest value 3, since the median of the areas is formed. This leads to the maximum deviation 8''' having a magnitude which is visible in the image. In order to prevent this, the average value 4' is formed by means of weighting, for example quadratic weighting of the register deviations 8.

The register deviations 8 can be defined in relation to a reference line, an imaginary desired value or in relation to another printing unit. Ultimately, the calculation of an average value 4 or 4' leads to the situation where the register deviations 8'''' of one printing unit from another printing unit are no longer visible—the decisive factor is therefore always the relative position of the registers 19 and 19'. Weighting the values achieves the situation where the maximum deviation 8' is reduced and, as a result, although there is an increase in the maximum deviation 8'', this lies within a range, which is not visible. Although only one curve 19 is illustrated in FIG. 4, it can be seen that, if the weighted averages 4' of two registers 19 and 19' are brought into alignment, the maximum mutual deviations 8'''''' are also kept low. In this case, it is possible for the weighting and the calculation to be adapted to the desired result and to be given circumstances in such a way the influence of the register differences is minimized in an optimum way.

Parts List

1 Register values
2 Arrow: transport direction
3, 3' Extreme values of the register
3 Lowest value
3' Highest value
4, 4' Average value of the register
4' Weighted average value
5, 5', 5'', 5''' Color printing units
5 Reference printing unit
6, 6' Measurement locations or sensors for measuring register values
7, 7', 7'', 7''' Data about the variation of lines of image points
8, 8', 8'', 8''',
8'''', 8''''' Register deviations
8', 8'' Maximum deviation of a register from the average value 4
8''', 8'''' Maximum deviation of a register from a weighted average value 4'
8''''' Maximum deviation of the register of two color printing units
9, 9' Register marks
10 Carrier for printing substrates
11, 11' Printing substrate/test substrate
12 Computer
13, 13', 13'', 13''' Writing heads
14 Paper widths
15, 15', 15'', 15''' Image cylinder
16, 16', 16'', 16''' Image transfer cylinder
17 Impression cylinder
18 Sensor for substrate detection
19 Register of a color printing unit
19' Register of another color printing unit
20 Direction transverse to the transport direction

What is claimed is:

1. A method of minimizing the influence of register differences in multicolor printing, in a digital printing press, having a plurality of printing units (5, 5', 5'', 5''') including a plurality of writing heads respectively, said method comprising the steps of:

measuring the value of register values (1) at a number of locations transversely with respect to a transport direction through a printing press, setting register values (1) in the transport direction (2) which are different transversely with respect to such direction to a value between the extremes (3, 3'), wherein a number of individual values of the register (1) are measured and an average value (4, 4') is determined from the variation in such register values, and brought into alignment with the average value (4, 4') from at least one further color printing unit (5, 5', 5'', 5''').

2. The method as claimed in claim 1, wherein variation of a line of image points formed by a writing head is measured and the data (7) is stored, wherein the register values (1) are measured transversely with respect to the transport direction (2) at at least one location (6, 6'), and wherein the variation of the line of image points is determined from the data (7, 7', 7'', 7''') and the at least one measurement and the average value (4, 4') is calculated.

3. The method as claimed in claim 2, wherein, in order to calculate an average value (4'), the deviations (8, 8', 8'', 8''', 8'''', 8''''') determined are weighted.

4. The method as claimed in claim 3, wherein quadratic weighting is carried out.

5. The method as claimed in claim 2, wherein a median between the lowest (3) and the highest value (3') is taken as the average value (4, 4').

6. The method as claimed in claim 4, wherein, in determining the average value (4, 4'), the lowest (3) and highest values (3') are not included.

7. The method as claimed in claim 6, wherein the average values (4, 4') of all the color printing units (5, 5", 5'") are brought into alignment with the average value (4, 4') of a reference printing unit (5).

8. The method as claimed in claim 7, wherein the register values (1) are determined by the measurement of lines of image points.

9. The method as claimed in claim 8, wherein the register values (1) are determined by measuring at least two register marks (9, 9') arranged spaced apart transversely with respect to the transport direction.

10. The method as claimed in claim 9, wherein the register marks (9, 9') are printed on a carrier (10) for printing substrates (11) and subsequently removed again.

11. The method as claimed in claim 9, wherein the register marks (9, 9') are printed onto a substrate (11') lying on the carrier (10) for printing.

12. Apparatus for implementing the method as claimed in claim 11, having at least one sensor (6, 6') for measuring register, wherein at least one sensor (6, 6') measures the register at at least two measurement locations (6, 6') spaced apart transversely with respect to the transport direction (2), and wherein a computer (12) is provided which calculates average register values (4, 4') and brings the average register values (4 or 4') of at least two color printing units (5, 5', 5", 5'") into alignment with one another.

13. The apparatus as claimed in claim 12, wherein the computer (12) brings the average values (4 or 4') of all the color printing units (5', 5", 5'") into alignment with the average value (4 or 4') from a reference printing unit (5).

14. The apparatus as claimed in claim 13, wherein the at least one sensor (6, 6') measures a large number of measurement locations (6, 6') transversely with respect to the transport direction (2).

15. The apparatus as claimed in claim 13, wherein a large number of sensors (6, 6') are arranged transversely with respect to the transport direction.

16. The apparatus as claimed in claim 15, wherein, for each color printing unit (5, 5' 5", 5'"), at least two sensors (6, 6') are arranged transversely with respect to the transport direction (2), and wherein the computer (12) is loaded with data (7, 7', 7", 7'") relating to the variation of a line of image points of at least one writing head (13, 13', 13", 13'"), and determines the average values (4 or 4') from the measurements of the sensors (6, 6') and the data (7, 7', 7", 7'").

17. The apparatus as claimed in claim 16, wherein the data (7, 7', 7", 7'") are stored as machine-specific nominal values of at least one writing head (13, 13', 13", 13'").

18. The apparatus as claimed in claim 16, wherein sensors (6, 6') are arranged to determine the data (7, 7',7",7'").

19. The apparatus as claimed in claim 18, wherein, in order to measure the register values (1), at least one sensor (6, 6') is provided to detect at least two register marks (9, 9') arranged spaced apart with respect to the transport direction.

* * * * *